United States Patent
Bylander et al.

(10) Patent No.: US 8,292,699 B2
(45) Date of Patent: Oct. 23, 2012

(54) OPTICAL FIBER POLISHING APPARATUS AND METHOD

(75) Inventors: James R. Bylander, Austin, TX (US); Gordon Wiegand, Austin, TX (US); Edward B. Lurie, Round Rock, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 405 days.

(21) Appl. No.: 12/525,338

(22) PCT Filed: Feb. 7, 2008

(86) PCT No.: PCT/US2008/053275
§ 371 (c)(1),
(2), (4) Date: Jul. 31, 2009

(87) PCT Pub. No.: WO2008/100768
PCT Pub. Date: Aug. 21, 2008

(65) Prior Publication Data
US 2010/0029180 A1    Feb. 4, 2010

(51) Int. Cl.
*B24B 23/00* (2006.01)
(52) U.S. Cl. ........................................ 451/344; 451/355
(58) Field of Classification Search .................. 451/41, 451/54, 59, 168, 344, 355, 529, 530, 539
See application file for complete search history.

(56) References Cited

U.S. PATENT DOCUMENTS

| | | | |
|---|---|---|---|
| 3,069,815 A * | 12/1962 | Valentine | 451/530 |
| 3,975,865 A | 8/1976 | Lewis | |
| 4,178,722 A | 12/1979 | Forman et al. | |
| 4,291,502 A | 9/1981 | Grimsby et al. | |
| 4,766,705 A * | 8/1988 | Dholakia | 451/59 |
| 4,905,415 A | 3/1990 | Moulin | |
| 4,979,334 A | 12/1990 | Takahashi | |
| 5,007,209 A | 4/1991 | Saito et al. | |
| 5,107,627 A | 4/1992 | Mock, Jr. et al. | |
| 5,185,966 A | 2/1993 | Mock, Jr. et al. | |
| 5,216,846 A | 6/1993 | Takahashi | |
| 5,220,703 A * | 6/1993 | Kanayama et al. | 15/210.1 |
| 5,337,390 A | 8/1994 | Henson et al. | |
| 5,349,784 A | 9/1994 | Grois et al. | |
| 5,351,445 A | 10/1994 | Takahashi | |
| 5,403,227 A | 4/1995 | Franklin et al. | |
| 5,408,558 A | 4/1995 | Fan | |
| 5,447,464 A * | 9/1995 | Franklin et al. | 451/28 |
| 5,464,361 A | 11/1995 | Suzuki et al. | |

(Continued)

FOREIGN PATENT DOCUMENTS

JP    59-110540 A    6/1984

(Continued)

*Primary Examiner* — Maurina Rachuba
(74) *Attorney, Agent, or Firm* — Gregg H. Rosenblatt (57) ABSTRACT

A polishing apparatus is provided for polishing an optical fiber connector. The optical fiber connector includes a connector housing and a ferrule. The polishing apparatus includes a mount to receive and hold the optical connector and a base to support the mount. The base further includes a dispenser portion. The polishing apparatus further includes a polishing strip dispensable by the dispensing portion of the base. The polishing strip has a portion thereof extending through a passageway formed in the mount, where a first surface of the polishing strip is disposed proximate to an end face of the ferrule of the optical connector disposed in the mount. In an exemplary aspect, the polishing strip comprises one or more polishing media disposed on a backing material.

3 Claims, 4 Drawing Sheets

U.S. PATENT DOCUMENTS

| | | | |
|---|---|---|---|
| 5,480,344 A | 1/1996 | Xu et al. | |
| 5,727,989 A * | 3/1998 | Ohno et al. | 451/41 |
| 5,768,738 A * | 6/1998 | Lee | 15/210.1 |
| 5,769,698 A | 6/1998 | Chudoba et al. | |
| 5,813,902 A * | 9/1998 | Wiegand | 451/65 |
| 5,947,797 A | 9/1999 | Buzzetti | |
| 6,099,392 A * | 8/2000 | Wiegand et al. | 451/41 |
| 6,190,239 B1 | 2/2001 | Buzzetti | |
| 6,309,278 B1 | 10/2001 | Suzuki et al. | |
| 6,466,723 B2 * | 10/2002 | Miyake et al. | 385/134 |
| 6,779,928 B2 | 8/2004 | Wada et al. | |
| 7,140,950 B1 | 11/2006 | Bylander et al. | |
| 7,369,738 B2 | 5/2008 | Larson et al. | |
| 7,476,279 B2 * | 1/2009 | Kida | 134/6 |
| 7,552,500 B2 * | 6/2009 | Forrest, Jr. | 15/210.1 |
| 2002/0108636 A1 * | 8/2002 | Childers et al. | 134/6 |
| 2003/0139118 A1 | 7/2003 | Wetenkamp et al. | |
| 2004/0086251 A1 | 5/2004 | Matsui et al. | |

FOREIGN PATENT DOCUMENTS

| | | |
|---|---|---|
| JP | 05-011141 A | 1/1993 |
| JP | 06-027330 A | 2/1994 |
| JP | 11-077507 | 3/1999 |
| JP | 2002-066895 | 3/2002 |
| JP | 2005-066763 | 3/2005 |
| KR | 20-0144730 Y1 | 6/1999 |
| WO | WO 2006-090358 A2 | 8/2006 |
| WO | WO 2006/134742 A1 | 12/2006 |

* cited by examiner

OPTICAL FIBER POLISHING APPARATUS AND METHOD

BACKGROUND OF THE INVENTION

1. Field of the Invention

The present invention is directed to an apparatus and method for polishing an optical fiber, in particular, an optical fiber terminated and polished in the field.

2. Background

In the area of optical telecommunication networks, fiber optic connectors are one of the primary ways to connect two or more optical fibers. There are several classes of optical fiber connectors including adhesive ferruled connectors, in which the fiber tip is held in a substantially fixed position relative to the tip of the ferrule by adhesively securing the fiber within the bore of the ferrule. Another class of connectors includes non-ferrule connectors, which rely on the buckling of a length of fiber to create contact pressure. Another class of connectors includes remote grip (ferruled) connectors, where the fiber is secured at some distance away from the terminal end or tip of the fiber.

When installing a remote grip connector in the field, one current practice uses a coplanar/flush polish. In remote grip connectors, as with other connector types, low optical losses and minimal reflections are achieved when the terminal ends of at least two optical fibers make secure physical contact. However, any differences in the coefficient of expansion between the fiber and the ferrule assembly may result in a non-contacting fiber tip when the temperature is raised, or lowered. The resulting gap can lead to significant reflection. A conventional remote grip connector is described in U.S. Pat. No. 5,408,558.

Another current practice involves a technician performing a field polish to create a fiber terminal end which protrudes beyond the ferrule tip. This method of polishing remote grip connectors produces a range of protrusions that provide a secure physical contact while avoiding excess force on the fiber tips. This method, when carefully followed, is sufficient to allow sufficient physical contact of the at least two fiber terminal end faces at temperatures for indoor applications (0° C.-60° C.). However, the conventionally polished field-terminated remote grip connector may not be recommended for outdoor use, which has more stringent temperature requirements (−40° C. to 80° C.). Factors leading to unacceptable optical loss may result from the intrinsic variability of the field polishing process, craftsman error, over polishing (e.g. using too much force or too many strokes and coarse, clogged or contaminated abrasive) or substitution of a different type of abrasive.

SUMMARY

According to an exemplary aspect of the present invention, a polishing apparatus is provided for polishing an optical fiber connector. The optical fiber connector includes a connector housing and a ferrule. The polishing apparatus includes a mount to receive and hold the optical connector and a base to support the mount. The base further includes a dispenser portion. The polishing apparatus further includes a polishing strip dispensable by the dispensing portion of the base. The polishing strip has a portion thereof extending through a passageway formed in the mount, where a first surface of the polishing strip is disposed proximate to an end face of the ferrule of the optical connector disposed in the mount. In an exemplary aspect, the polishing strip comprises one or more polishing media disposed on a backing material.

According to another exemplary aspect of the present invention, a polishing apparatus is provided for polishing an optical fiber connector. The optical fiber connector includes a connector housing and a ferrule. The polishing apparatus includes a support platform including a polishing section, a cleaving section and a connector mounting section. The connector mounting section includes a mount to receive and hold the optical connector. The cleaving section includes a blade to remove a terminal end of an optical fiber disposed in the ferrule. The polishing section includes a dispenser disposed on the support platform, where the dispenser dispenses a polishing strip. The polishing strip has a portion thereof extending through a passageway formed in the support platform, where the polishing strip is disposed proximate to an end face of the ferrule of the optical connector disposed in the mount.

According to another exemplary aspect of the present invention, a method of polishing an optical connector comprises providing an optical fiber having a stripped terminal end, inserting the fiber through a connector body and a ferrule, and securing the optical fiber in the optical connector. The method further includes mounting the optical connector in a mount portion of a polishing apparatus, the polishing apparatus further including a base to support the mount, the base further including a dispenser portion, and a polishing strip dispensable by the dispensing portion of the base, the polishing strip having a portion thereof extending through a passageway formed in the mount, where a first surface of the polishing strip is disposed proximate to an end face of the ferrule of the optical connector disposed in the mount. To achieve a polish of the fiber end, the polishing strip is pulled through the passageway in a direction transverse to an axial direction.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The present invention is directed to an apparatus and method for polishing an optical fiber terminated in an optical fiber connector. As described herein, a simple method of field polishing and assembly of an optical connector can provide consistent, repeatable results and can substantially reduce the craft sensitivity, when contrasted with traditional field polishing methods, and can reduce connector costs.

Figure 1A:
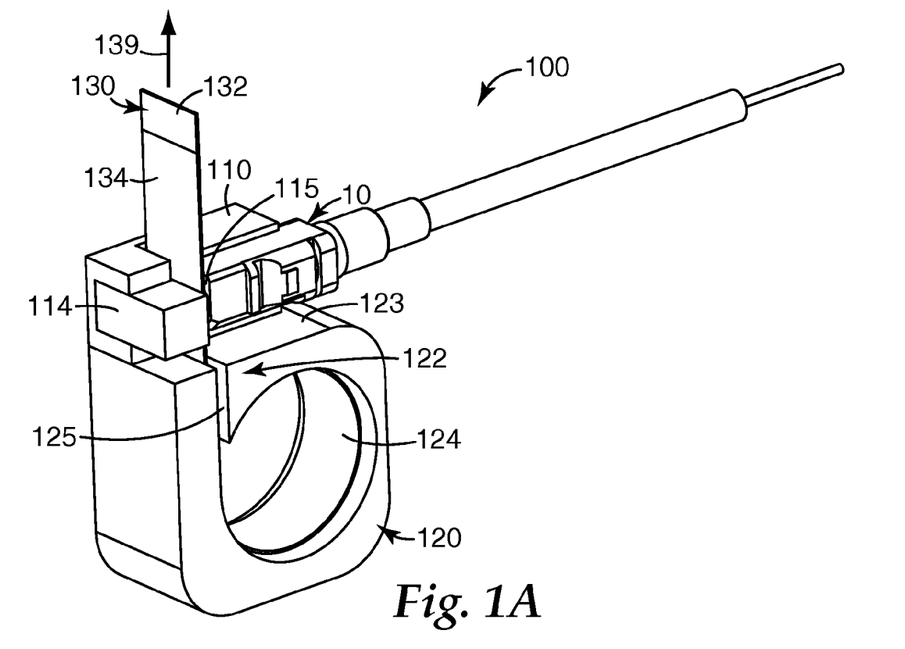
FIG. 1A is an isometric view of an exemplary polishing apparatus according to an embodiment of the present invention.
Figure 1B:
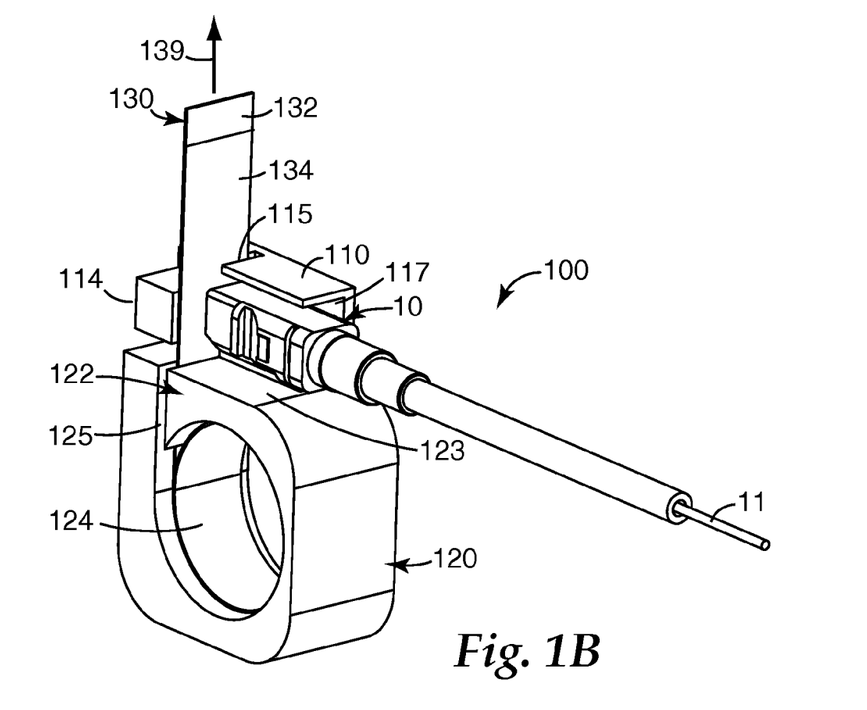
FIG. 1B is another isometric view of an exemplary polishing apparatus according to an embodiment of the present invention.
Figure 1C:
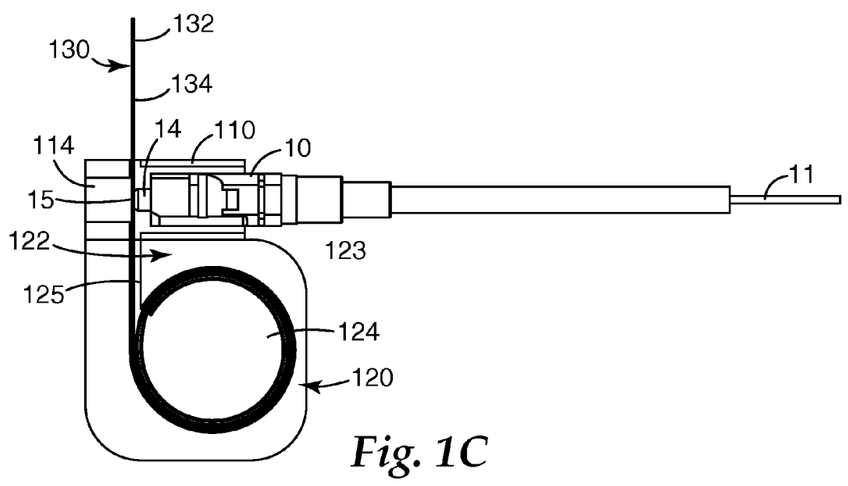
FIG. 1C is a cross section view of an exemplary polishing apparatus according to an embodiment of the present invention.

FIGS. 1A-1C illustrate different schematic views of an exemplary embodiment of the present invention, a polishing apparatus 100, and its components thereof. The polishing apparatus 100 includes a connector mount 110, a base 120, and a polishing strip 130. Mount 110 is configured to receive an optical fiber connector 10 therein. As described in further detail below, once the optical fiber connector is fully mounted in connector mount 110, the protruding fiber tip can be polished simply by pulling the polishing strip 130 in the direction of arrow 139.

The base can include a dispenser 122 that dispenses the polishing strip 130 through a slot 125 formed in an upper surface 123 of the base 120. As shown in FIGS. 1A-1C, dispenser 122 can include a container portion 124 to hold or otherwise support a single polishing strip 130 or a roll of polishing strips (not shown). The slot 125 is configured to provide passage of the polishing strip 130 to a conduit or passageway 115 formed in the connector mount 110. In a preferred aspect, the base 120 is configured, and is of a sufficient size, to be hand-held by a field technician in a straightforward manner.

Figure 3:
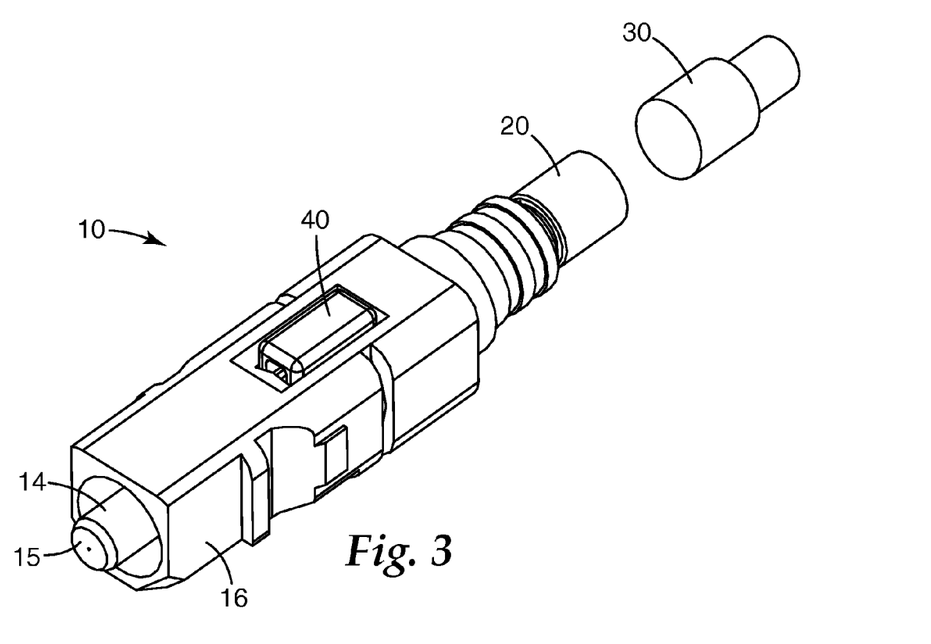
FIG. 3 is an isometric view of an exemplary remote grip connector.

The connector mount 110 is configured to receive a conventional optical fiber connector. For example, a conventional connector can include a remote grip connector 10 (see e.g. FIG. 3), such as a Crimplok™ Connector available from 3M Company (St. Paul, Minn.). This exemplary connector 10 includes a fiber connector housing 16 and having an optical fiber 11 terminated in the connector ferrule 14. When the optical fiber connector 10 is mounted in mount 110, the mount 110 is configured to bring the ferrule face 15 and fiber tip (now shown) into proximity of the polishing surface of the polishing strip 130. The structure of exemplary connector 10 is described in more detail below.

In alternative embodiments, the conventional connector can include a 3M™ 8300 Hot Melt SC connector, 3M™ 8206 FC/APC Connector (Epoxy) available from 3M Company (St. Paul, Minn.) or other standard connector formats. In a further alternative, the connector mount can be configured to receive a connector having multiple fibers, such as an MT fiber connector.

The mount 110 is configured to hold and secure an optical fiber connector 10. As shown in FIG. 1A, and in cut out form in FIG. 1B, the mount 110 can include a hole or aperture 117 longitudinally formed in a portion thereof to allow the ferrule 14 of connector 10 to pass through. The connector mount 110 can be supported on and secured to the base 120 by a conventional fastener or adhesive.

The mount 110 and base 120 can be constructed from a rigid material, such as a metal or a molded polymer (e.g., a glass or mineral filled plastic). In an alternative embodiment, the mount 110 and base 120 can be integrally formed as a single unit.

In an exemplary aspect, mount 110 can be configured to receive ferrule 14 of connector 10 to provide a snug, slideable fit to hold connector 10, e.g., by a snap fit. Preferably, connector 10 can be held at a predetermined angle, e.g., a flat polish that is perpendicular to the longitudinal direction of the fiber or an angled polish that is at a small angle from perpendicular (about 5° to about 12°). The mount 110 can further include a pressure pad 114 disposed thereon on an opposite side of the polishing strip passageway 115 to provide a force to hold the polishing strip against the fiber tip during the polishing operation. In an exemplary aspect, the pressure pad can be formed from a rubber material having a Shore A durometer of about 20 to about 85, depending on the type of the connector being polished. For example, the pressure pad used when polishing a remote grip connector such as 3M™ Crimplok™ connectors can typically have a shore A durometer of about 22. The durometer measured with the polishing film on the surface is about 62. Epoxy connectors, such as 3M™ 8206 FC/APC Connector, are typically polished on a pad having a durometer of about 80 to about 85. The contact force can vary from about 20 grams force to about 350 grams force depending on the length of the protruding fiber and the abrasive media. The combination of contact force, compliance of the polishing surface and shape of the ferrule tip cooperate to help provide a desired shape on the polished fiber surface.

Figure 2:
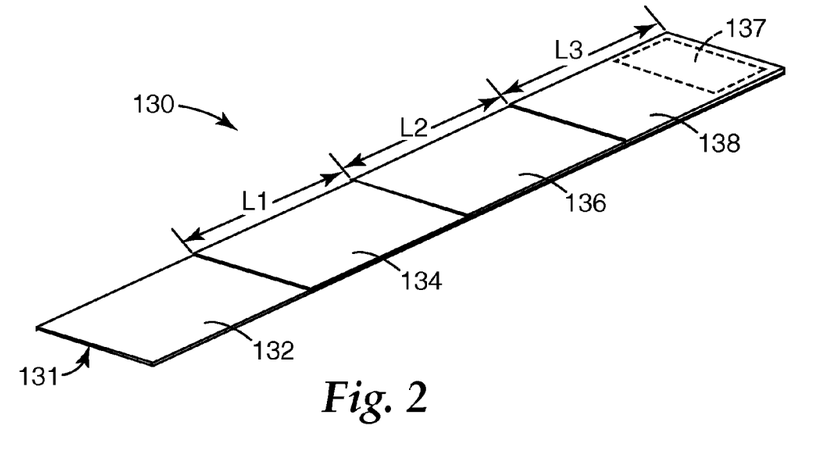
FIG. 2 is an isometric view of an exemplary polishing strip according to another embodiment of the present invention.

Referring to FIG. 2, the polishing strip 130 comprises one or more different polishing materials formed on a backing 131. For example, as shown in FIG. 2, polishing strip 130 can include a first polishing media or material 134, a second polishing media or material 136, and a third polishing media or material 138, each occupying a particular section of the polishing strip 130. Preferably, polishing media 134 comprises a first abrasive material that is more abrasive than the material comprising polishing media 136 (as material 134 is the first polishing material to contact the fiber tip as the strip is pulled upward in the direction of arrow 139 shown in FIG. 1). Also, a portion 132 of the polishing strip can be designed as a tab portion, without any polishing media, for the field technician to grip to perform the pulling procedure.

In an exemplary aspect, polishing media 134 includes an abrasive material of larger grit size (e.g., 5-10 μm grit size), whereas polishing media 136 and 138 can each comprise relatively finer grit-sized materials (in a descending order). Each section of the polishing strip can be of a sufficient length to provide the appropriate polish. In one example, the polishing strip can be about 40 cm to about 70 cm in total length, with a width of about 1 cm to about 3 cm. Of course, the total length and the particular lengths (L1, L2, L3, etc.) of each different polishing section can be determined depending on the particular application, the type of fiber or fibers being polished, the type of specifications to be met by the connector, and so forth. The width of the polishing strip can be kept small for single fiber tip polishing, or it can be wider for multiple fiber tip polishing, such as when an MT fiber connector, or the like, is being utilized.

The backing 131 can formed from a polymer film material such as a polyester film with a pressure sensitive adhesive for attaching the polishing media or a paper backing. For example, the polyester film can have a thickness of about 3 mil (0.08 mm). Alternatively, the abrasive grit may be deposited directly onto the backing in bands that run the length of the process web. This web can then be converted by cutting strips of a desired width perpendicular to the length of the web to yield strips having multiple different polishing media. In addition, the backing can be formed of multiple thicknesses to support polishing media of different grit sizes, etc., depending on the particular fiber or fibers being polished. As an example, the backing may be of a first thickness for an initial length when the protrusion of the fiber tip is the greatest (and at greatest risk of breaking) and then vary in thicknesses in a second length where the protrusion of the fiber has been reduced. Furthermore the backing may be more compliant (e.g., single layer) behind the transitions from one abrasive to another abrasive, and firmer over the central regions of each type of polishing media. This particular structure can reduce the potential for fiber damage at the transition point in the case that the media overlap at the joint. In the example of FIG. 2, three different abrasive materials are shown. Of course a smaller number or a larger number of abrasive materials may be formed on polishing strip 130, depending on the application. In one alternative embodiment, the backing can further include a relatively small amount of adhesive, for example, disposed at location 137, to adhere to the next individual fiber strip of the roll.

The specific sequence of abrasive media can depend on a number of factors including the application in which the connector will be used, the type of finish needed, and the type of connector being polished. A single media such as 2 μm silicon carbide could be used for multimode connectors typically used in local area networks. Single mode connectors with more stringent specifications may require 3 or 4 grit sizes with the final grit being below about 1 μm.

When in use, a terminated optical fiber connector 10 is placed in mount 110 so that a portion of ferrule 14 of the optical fiber connector 10 extends through central bore or aperture 117. With the connector secured, the polishing strip can then be moved or slid across the fiber/ferrule tip extending through ferrule face 15 by simply pulling the top part of the strip 132 in a direction 139 (away from the base/dispenser 120).

As mentioned above, FIG. 3 shows an exemplary remote grip optical fiber connector 10 that includes a connector housing 16. Exemplary connector 10 further includes a fiber gripping portion 40 which includes a fiber gripping element positioned inside the connector body (and thus not shown) and a crimping cap that slides onto and actuates the gripping element. Connector 10 further includes a ferrule 14 disposed at one end of the connector housing 16 and a compressible sleeve 20 disposed at the other end of the connector housing 16. Both the connector and ferrule have a bore in the longitudinal direction. These bores are aligned when the ferrule is joined to the connector body to allow the passage of an optical fiber therethrough. In this exemplary embodiment, connector 10 is a remote grip connector, where the fiber is secured at a distance of about 0.1 inch or greater (e.g., 0.5 inch) from the end face 15 of the ferrule 14. Connector 10 can further include a crimp ring 30 that slides over the sleeve to secure the strength members of the optical fiber cable to the connector and a strain relief boot (not shown) that controls the bend radius of the optical fiber as it exits the connector. An exemplary connector is described in U.S. Pat. No. 5,337,390 and is herein incorporated by reference in its entirety.

Figure 4A:
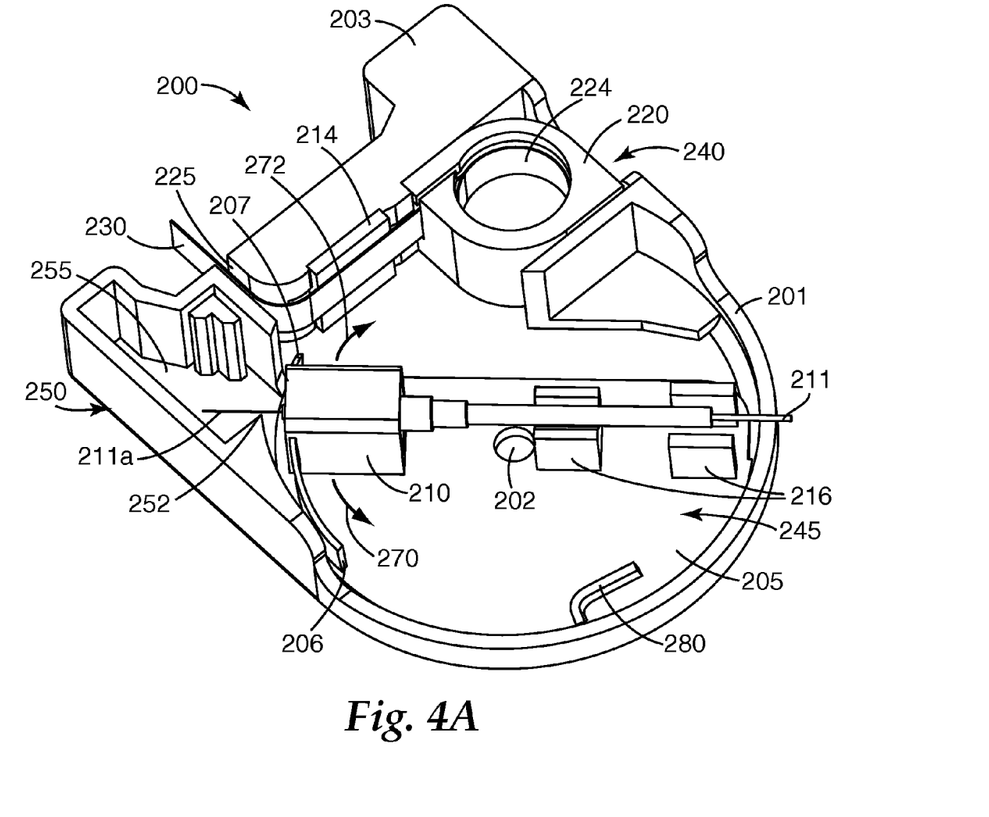
FIG. 4A is a first isometric view of another exemplary polishing apparatus according to an embodiment of the present invention.
Figure 4B:
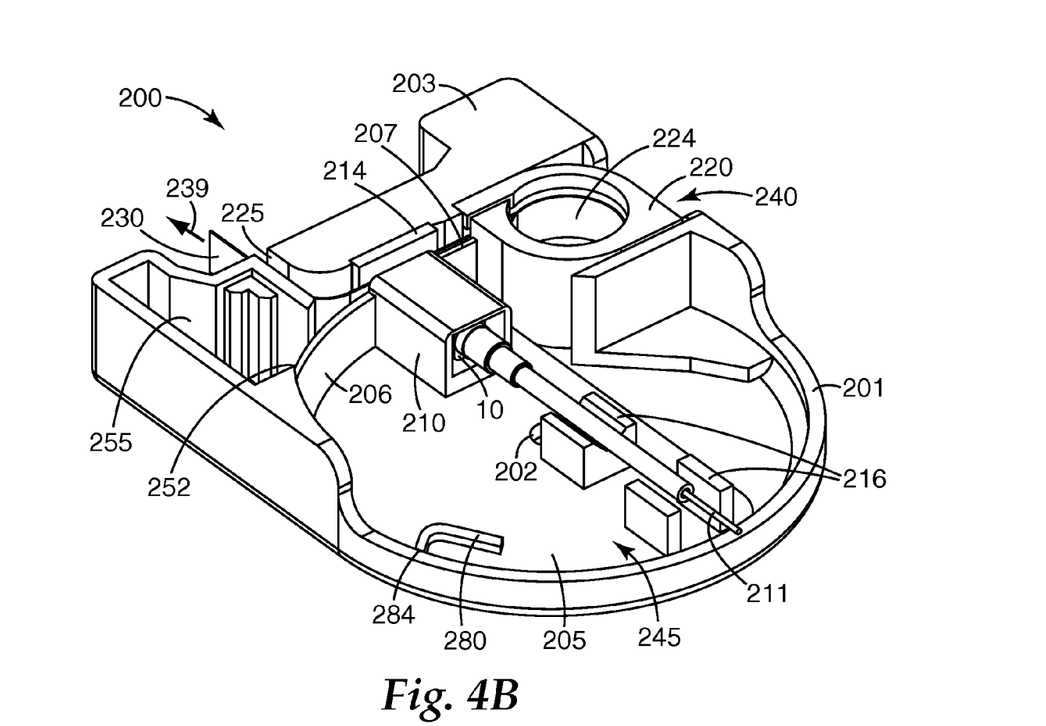
FIG. 4B is a second isometric view of another exemplary polishing apparatus according to an embodiment of the present invention.

In a second exemplary embodiment of the invention, the polishing apparatus may provide a cleaving section in addition to a polishing section. FIGS. 4A and 4B illustrate different schematic views of the second exemplary embodiment of the present invention, a polishing apparatus 200, and its components thereof. The polishing apparatus 200 can include a support platform 201 that can include one or more sections, such as a connector mount section 245, a cleaving section 250 and a polishing section 240.

The connector mount section can provide a connector mount for securing the optical connector (such as optical connector 10, shown in FIG. 3) in the apparatus 200. Also, the connector mount section can provide preliminary alignment, guiding and support for the fiber. This mount section of the platform can also be used to position the fiber end for insertion into the connector 10. In one aspect of this embodiment, the connector mount section 245 includes a rotary stage 205. The rotary stage 205 is rotatably attached to the support platform 201 at pivot point 202. A connector mount 210 is attached to the rotary stage 205 such that the connector may be moved between the cleaving section and the polishing section of apparatus 200. Mount 210 is configured to receive a conventional optical fiber connector, such as is described above. For example, a conventional connector can include a remote grip connector 10 (see e.g. FIG. 3), such as a Crimplok™ Connector available from 3M Company (St. Paul, Minn.).

Additionally, the rotary stage 205 may include one or more fiber support guides 216 positioned behind and in line with the connector mount 210. As described in further detail below, once the optical fiber connector 10 is fully inserted in connector mount 210, the optical fiber 211, having a stripped terminal end 211a, can be inserted into the connector with the aid of the support guides 216 such that the terminal end 211a of the fiber extends beyond the endface of the ferrule. The support guide(s) 216 can also be designed such that the guides hold or clamp the optical fiber in place after insertion of the fiber into the connector, but prior to securing the fiber in the connector. This clamping can help prevent rotation or slippage of the fiber. For example, in one alternative aspect, the rotary stage 205 can further include an actuation and/or clamping device to actuate the gripping element of a remote grip connector (or other mechanical gripping connector). The actuation and/or clamping device can be configured similarly to that described in U.S. Pat. No. 7,369,738, incorporated herein by reference in its entirety.

The rotary stage may also have a mechanism for positioning itself. For example, FIGS. 4A and 4B show a latch structure 280 that may interact with one or more detents (or other structures) on the support platform (not shown) to position the rotary stage in the proper position for inserting the optical fiber 211. The latch 280 may be released to allow the rotary stage to be pivoted in a first direction 270 to perform the cleaving step. The rotary stage may then be moved in a second direction 272 until latch 280 engages with a second detent 284 on the support platform to position the connector for polishing. When the connector is placed in position for polishing, connector 10 is held in mount 210 such that mount 210 brings the ferrule face 15 and the fiber tip into proximity of the polishing surface of polishing strip 130.

In an exemplary aspect, the cleaving section 250 includes a compartment 255 and a blade 252. The compartment allows for initial insertion of the optical fiber 211 into an optical connector 10 mounted in the connector mount 210 on the rotary stage 205 such that the stripped terminal end 211a of the fiber protrudes from the ferrule. The rotary stage can then be pivoted in a direction 270 so that the terminal end 211a of the optical fiber is brought into contact with blade 252 resulting in the cleaving of any excess length of fiber protruding beyond the end of the ferrule. In an alternative aspect, blade 262 can be positioned in a different location in the cleaving section 250 (e.g., opposite its position shown in FIG. 4A) such that movement in the direction 272 would bring the fiber terminal end 211a in contact with the blade to generate a fiber cleave.

The compartment 255 may also include a cover (not shown) such that the cleaved terminal end of the fiber or fiber shards are retained in the compartment. Walls 206, 207 on the rotary stage can prevent the cleaved terminal end of the fiber or fiber shards from escaping the compartment during subsequent polishing of the connector or processing of additional connectors with the apparatus 200.

After cleaving, the mount may be rotated in the direction of 272 so that the cleaved terminal fiber end and ferrule are positioned at the polishing section 240. The polishing section 240 can include a base 203 attached to the support platform 201 having a dispenser 220 attached thereto that dispenses the polishing strip 230 through a slot 225 formed in the support platform between the base and the wall of compartment 255. As shown in FIGS. 4A and 4B, dispenser 220 can include a container portion 224 to hold or otherwise support a single polishing strip 230 or a roll of polishing strips (not shown). The polishing section 240 can further include a pressure pad 214 disposed in base 203 to provide a force to hold the polishing strip against the fiber tip during the polishing operation. The connector is polished by pulling the polishing strip in a direction 239 away from apparatus 200.

In a preferred aspect, apparatus 200 is configured, and is of a sufficient size, to be hand-held by a field technician in a straightforward manner.

An exemplary method of the present invention provides a repeatable process that can lead to field polishing results. In particular, the following method can be employed to effectuate one or more field polished optical fiber connectors in a straightforward manner.

In one example, first, a strain relief boot and a crimp ring (see e.g., FIG. 3) can be threaded onto the fiber being field terminated. The connector can be seated in an actuation tool (not shown). Lengths of optical fiber cable can be prepared by removing a terminal portion (e.g., ~2.25 in.) of the cable jacket. The fiber can then be stripped of its buffer coating such that the buffer coating extends about 0.5 inch beyond the cable jacket. The fiber can then be inserted into the connector until the cable jacket bottoms out in the connector, causing the fiber to form a gentle bend against the actuation tool.

A crimping tool can be used to compress a sleeve around the fiber jacket to secure the fiber cable in place. Next, the actuation tool can be used to press the crimp element cap into place such causing the crimp element to close around the bare glass fiber behind the connector ferrule. The Kevlar™ strength members can be trimmed to a desired length. The Kevlar fibers can be fanned out around the connector and the crimp ring can be slid forward until it seats against the back end of the connector. The crimp ring can then be crushed into the strength members and the strain relief boot slid into place to complete assembly of the connector. Then, an excess length of fiber can be removed leaving about 80 to about 100 microns of fiber protruding from the ferrule tip to prepare the connector for polishing. Next, the connector can then be inserted into the holder with the fiber tip pressed against the polishing strip. The polishing strip is then pulled resulting in the polishing surface moving across the fiber tip, both removing the excess protrusion and creating a smooth surface. The finished connector can then be removed from the holder, cleaned with a lint free material and used. Alternately, the polishing strip may include a section of cleaning material following the polishing materials, in which case the final cleaning step may be eliminated. A second connector can be then placed in the mount, and the polishing can be accomplished by pulling out a second polishing strip in a manner such as described above.

The exemplary embodiments described above can simplify the field polishing process, while controlling several sources of variability that have in the past led to a skill-level dominated practice. For example, the common "air polishing" practice of beginning a field polish while holding an abrasive polishing material in air (without any controlled backing force being applied) can be eliminated. Also, the field technician no longer must count strokes in a hand polishing process. Further, the need to continually replace materials on the polishing pad is eliminated. Moreover, the use of a dispenser for polishing strips allows for the use of strips with varying backing stiffness. The polishing apparatus can be a simple hand tool, without the need for a motor or power source. Also, the amount of polishing media being utilized can be better controlled.

While the invention above has been described mainly with respect to a single fiber remote grip connector using a mechanical fiber grip, the apparatus and method described herein may be used with a multi-fiber connector (e.g. a multi-fiber MT-type remote grip connector), and/or a remote adhesive grip, as would be apparent to one of ordinary skill in the art given the present description.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. A polishing apparatus for polishing an optical fiber connector, the optical fiber connector including a connector housing and a ferrule, comprising:
   a support platform including a polishing section, a cleaving section and a connector mounting section;
   wherein the mounting section includes a mount to receive and hold the optical connector,
   wherein the cleaving section includes a blade to remove a terminal end of an optical fiber disposed in the ferrule, and
   wherein the polishing section includes a dispenser disposed on the support platform, wherein the dispenser dispenses a polishing strip, the polishing strip having a portion thereof extending through a passageway formed in the support platform, wherein the polishing strip is disposed proximate to an end face of the ferrule of the optical connector disposed in the mount, wherein the platform further comprises a rotatable stage disposed thereon, wherein the mounting section is disposed on the rotatable stage, the rotatable stage providing movement of the connector ferrule mounted in the mounting section from the cleaving section to the polishing section.

2. The polishing apparatus of claim 1, wherein the cleaving portion includes a compartment for collecting the removed terminal ends of the optical fiber.

3. The polishing apparatus of claim 1, wherein the connector mount is moveable on the support platform.

* * * * *

UNITED STATES PATENT AND TRADEMARK OFFICE
CERTIFICATE OF CORRECTION

PATENT NO.       : 8,292,699 B2                          Page 1 of 1
APPLICATION NO.  : 12/525338
DATED            : October 23, 2012
INVENTOR(S)      : James R. Bylander et al.

It is certified that error appears in the above-identified patent and that said Letters Patent is hereby corrected as shown below:

Title Page,
After Item [87], please insert the following Domestic Priority data which is stated on the Filing Receipt but does not appear on the printed patent:

-- [60], Related U.S. Application Data
Provisional application No. 60/890,364, filed on February 16, 2007. --

Signed and Sealed this
Twenty-sixth Day of February, 2013

Teresa Stanek Rea
*Acting Director of the United States Patent and Trademark Office*